United States Patent [19]

Oswald

[11] 4,233,652
[45] Nov. 11, 1980

[54] AIRCRAFT ILLUMINATION APPARATUS AND OPERATING CIRCUITRY

[75] Inventor: George J. Oswald, Boise, Id.

[73] Assignee: Morrison-Knudsen Company, Inc., Boise, Id.

[21] Appl. No.: 821,131

[22] Filed: Aug. 2, 1977

[51] Int. Cl.³ ............................................. B64D 47/02
[52] U.S. Cl. ......................................... 362/63; 362/62; 362/253; 362/276; 362/295; 340/27 R; 315/83
[58] Field of Search ...................... 362/62, 63, 66, 295, 362/155, 276, 253; 340/25, 27, 28; 244/1 R, 102 R, 129.4; 315/83

[56] References Cited

U.S. PATENT DOCUMENTS

| 2,124,346 | 7/1938 | Grimes | 362/63 |
| 2,177,618 | 10/1939 | Montgomery et al. | 315/83 |
| 2,244,535 | 6/1941 | Grimes | 362/62 |
| 2,286,338 | 6/1942 | Bruno | 362/63 |
| 2,362,110 | 11/1944 | Meyerhoefer | 362/62 |
| 2,443,007 | 6/1948 | Katz | 362/63 |
| 3,373,311 | 3/1968 | Neulingier et al. | 315/83 |

FOREIGN PATENT DOCUMENTS 567386 12/1958 United Kingdom ..................... 362/63
864205 3/1961 United Kingdom ..................... 362/63

OTHER PUBLICATIONS

"Flying", Beechcraft, Beechcraft Aircraft Corporation, Nov. 1970, pp. 74, 75.

Primary Examiner—Benjamin R. Padgett
Assistant Examiner—J. Lloyd Barr
Attorney, Agent, or Firm—Shanley, O'Neil and Baker

[57] ABSTRACT

An improved aircraft illumination apparatus and improved circuitry for operating the illumination apparatus. Light sources are mounted on the interior of the aircraft landing gear doors for providing illumination ahead of the central portion of the aircraft. A reliable electrical circuit is provided for automatically turning the light sources on when the landing gear doors open and for automatically turning them off when the doors close. The circuit includes a power circuit for carrying the relatively heavy load current and a control circuit for carrying a smaller control signal for controlling the load current. The landing gear door switch means is connected in the control circuit, and controls application and interruption of the load current.

8 Claims, 5 Drawing Figures

FIG. 3
FIG. 4
FIG. 5
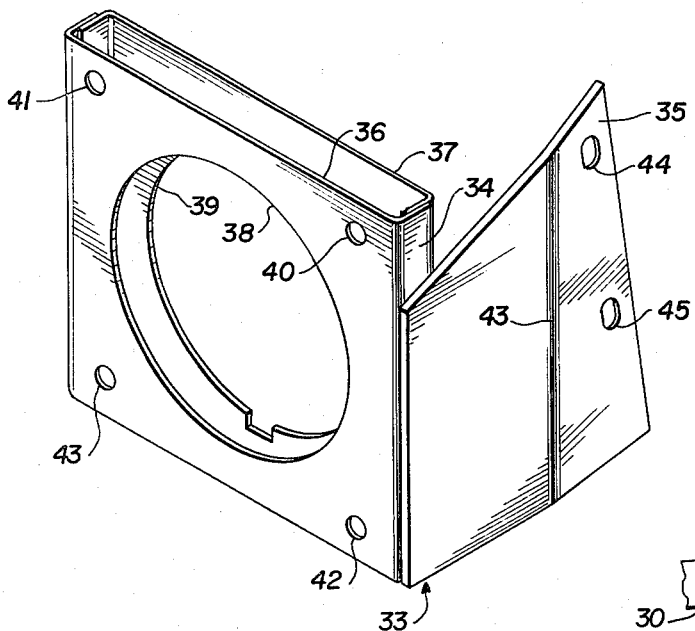
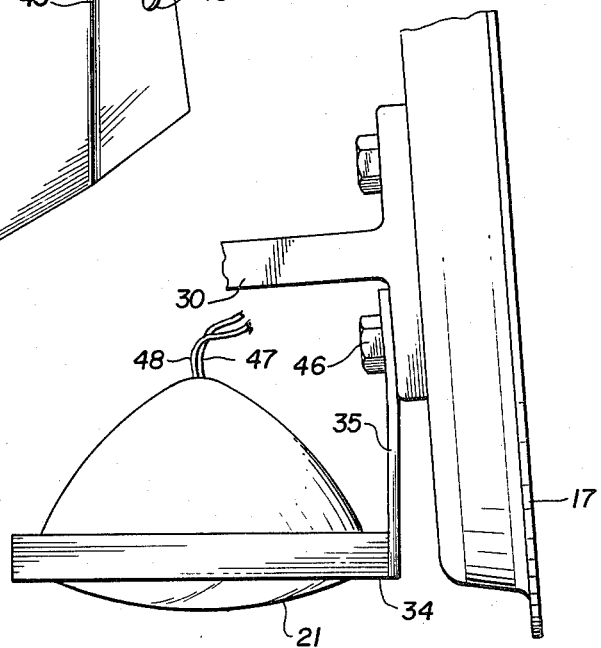
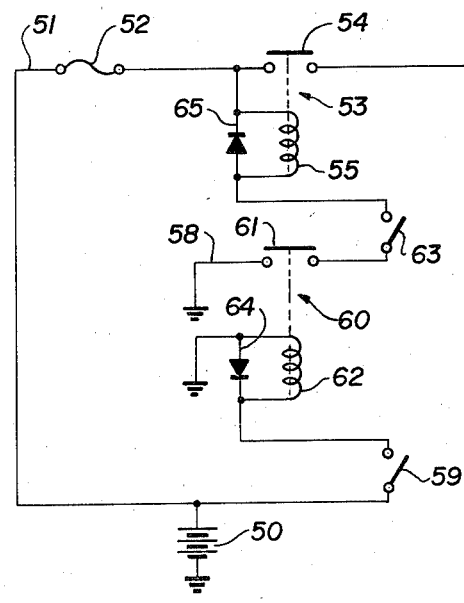

AIRCRAFT ILLUMINATION APPARATUS AND OPERATING CIRCUITRY

The present invention is directed to an improved illumination system for an aircraft and to improved lighting operating circuitry for an aircraft. More particularly, the invention provides an aircraft having lights which are mounted on the interior of the front landing gear doors for providing illumination ahead of the central portion of the aircraft at take-off, landing, and when taxiing. Additionally, an electrical circuit for reliable and long service life operation is provided for automatically energizing the lights when the front landing gear doors are extended and for de-energizing the lights when the doors are retracted.

Most winged aircraft have lights mounted in the front of the wings for providing illumination during take-off and landing. These lights are usually enclosed in plastic lenses which conform to the shape of the wings so as not to disrupt the airfoil. While such wing mounted lamps are of assistance in landing, since they are situated to provide light in the area directly in front of the wings, they leave a gap or void in front of the center of the aircraft. This gap or void, particularly noticeable in some aircraft, can seriously hamper visibility, and can create problems when taxiing, especially in an unfamilar airport.

An additional problem is that the plastic lenses used with the wing mounted lamps have a tendency to soften or melt if exposed to heat for extended periods while on the ground. This imposes a time limitation on the use of the wing lights, which of course, can be a serious problem if illumination is required for more than a minimal amount of time.

As can be appreciated, any electrical circuit used in operating an aircraft or elements thereof such as retractable lights must be extremely reliable and must be capable or providing failure-free operation over an extended period of time. It appears that some of the retractable aircraft light circuits used in the prior art have not met these requirements. Additionally, some retractable aircraft lights of the prior art have required the use of separate housing doors and a motor not otherwise needed on the aircraft to provide for automatic extension and retraction of the lights. Also, aircraft lights when mounted on landing gear structure, are subject to landing impact which can be harmful to lamp life.

It is therefore an object of the invention to provide an aircraft having an improved illumination system.

It is a further object of the invention to provide an illumination system for an aircraft which is capable of operating for an indefinitely long period of time.

It is a further object of the invention to provide an extensible and retractable aircraft light mounted on an aircraft landing gear door which does not require an operating motor not otherwise present on the aircraft.

It is a further object of the invention to provide a highly reliable circuit for operating such a retractable aircraft light.

As part of the novel concept of the invention, an aircraft is provided having a light mounted on the interior of each front landing gear door for providing illumination ahead of the fuselage of the aircraft when landing gear doors are open. A circuit is provided for automatically turning the lights on when the doors open, and for automatically turning them off when the doors close. Further, the circuit includes a cabin switch which provides a pilot with independent on-off control of the lights when the doors are open.

An important contribution of the circuit of the invention provides separate power and control circuits which effectively isolates the switch means which is responsive to the movement of the extensible and retractable mechanism of the aircraft from the relatively large load current and, thereby, ensures that the switch means does not become pitted and defective with normal usage in a relatively short time, as would occur if the load current were passed through it. Thus, the circuit of the invention includes power circuit means for carrying load current, a control circuit for carrying a control signal, and a switch means for changing state responsive to the movement of the aircraft retractable and extensible mechanism. The power circuit includes means for interrupting the load current. The control circuit intercouples the switch means and the power circuit and includes control means for controlling the means for interrupting the load current in the power circuit responsive to the state of the switch means.

The invention will be better understood by referring to the accompanying drawings in which:

FIG. 3 is a perspective view of a light source mounting means.

FIG. 4 is a top view showing the light source mounting means attached to a hinge means of the landing gear door.

FIG. 5 is a schematic diagram of the novel lamp operating circuit apparatus of the invention.

Figure 1:
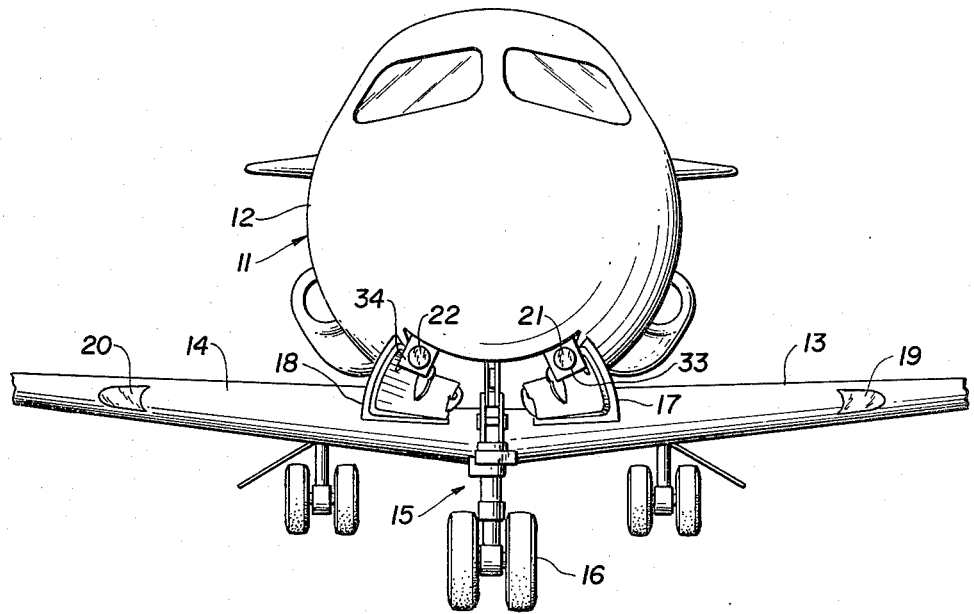
FIG. 1 is a front view of an aircraft incorporating the novel illumination apparatus of the invention.

FIG. 1 is a front view of aircraft 11, having fuselage 12, wings 13 and 14, front landing gear assembly 15 with wheels 16, front landing gear doors 17 and 18, and wing mounted lights 19 and 20. The latter are enclosed in plastic lenses which conform to the shape of the airfoil.

While the wing mounted lights 19 and 20 can be adequate during approach, they leave a gap or void in front of the central portion of the aircraft which can be particularly troublesome when taxiing. Additionally, the plastic lenses which enclose the lights have a tendency to melt if the lights are kept on too long, which imposes a time limitation on their use.

As is known, landing gear doors 17 and 18 are opened well before landing to allow landing gear assembly 15 to lower to the operating position and, these doors are usually closed when clearing the field after the landing gear has been raised to the retracted position.

The invention teaches mounting of light sources 21 and 22 on the interiors of the landing gear doors 17 and 18. Mounting means are provided which can be supported by landing gear door structure without substantial modification of the latter or the landing gear. The motorized means for extending and retracting the landing gear doors are conventional and known and perform a function in the present invention without adding to the planes normal mechanization. Thus, in distinction to the prior art retractable wing mounted lights, no additional motor and/or extending and retracting mechanism need be provided. A novel long service life circuit is arranged to automatically turn the light sources on when the doors open and to automatically turn them off when the doors close. Since illumination in front of the fuselage is necessary only at take-off, landing and taxiing, times when the doors are open, the teachings of the invention on use of the landing gear doors provide an extremely advantageous mounting location for the light sources.

Figure 2:
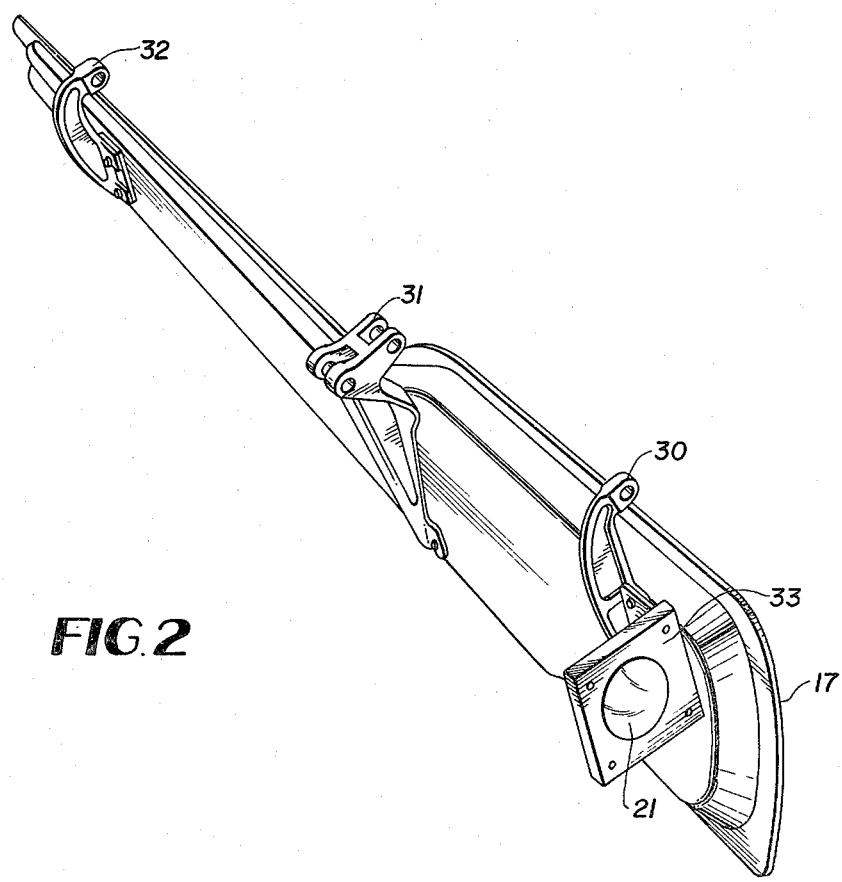
FIG. 2 is a perspective view of an exemplary front landing gear door with a light source mounting means attached.

The interior side of an exemplary landing gear door is shown in FIG. 2. Door 17 is supported by front hinge 30, middle hinge 31, and rear hinge 32 which permit the door to pivot with respect to the fuselage. Light source mounting structure 33, shown in greater detail in FIGS. 3 and 4, is secured to door 17 with the attachment structure for forward hinge 30.

Referring to FIG. 3, mounting structure 33 includes lamp frame 34 and door attachment flange 35; the latter extends at substantially right angles to frame 34.

Lamp frame 34 can include front and rear U-shaped members 36 and 37 respectively, which are welded or otherwise secured together as shown. These define central circular opening 38 and 39. During mounting, the front of a light source extends through openings 38 and 39. The light source can be attached to frame 34 by bolts extending through holes 40, 41, 42 and 43. Door attachment flange 35 may be bent along line 43, or otherwise shaped to a desired contour with the door plate of hinge 30.

The light can be mounted without altering the structure or function of the landing gear door. Hinge bolts are inserted through holes 44 and 45 and the hinge plate is then re-secured.

A top view of the mounting means and sealed beam light source 21 having connection wires 47 and 48 is shown in FIG. 4. The slotted configuration holes 44 and 45 is provided to allow angular disposition of the light source to be adjusted in individual situations. The aircraft depicted in FIG. 1 is a DeHavilland/Hawker-Siddeley DH-125. While the invention has been found to be particularly advantageous with this type of aircraft, it is to be understood that it is applicable to any type of aircraft having a front landing gear door.

Referring to the schematic diagram of the lamp operating circuit apparatus of FIG. 5, power source 50 may be a storage battery which is charged by a generator; typically source 50 would have an output voltage of 28 volts. Door switch 59 would typically be a microswitch mounted for operation by one of the doors so as to change state when the landing gear doors are opened and closed. Suitable switch means could also be operated by the gear down indicator of the aircraft or other mechanical switch arrangement which changes state when the landing gear doors open and close. The object of the circuit is to cause a load current to flow through light sources 56 and 57 illuminate the light sources when the landing gear doors open and switch means 59 changes state and, to interrupt the load current so that the light sources turn off when the doors close and switch means 59 changes to its other state. While this could be accomplished by passing the load current directly through a switch means connected in series with the light sources, in such an arrangement the switch means would have to carry the relatively heavy load current; interruption of such load current would likely damage the switch means and cause early failure.

In accordance with the invention, separate power and control circuits are provided, and the control circuit, in which the switch means 59 is connected, is arranged to carry significantly lower current than the power circuit. The power circuit is comprised of power source 50, line 51, circuit breaker 52, current interruption means 54, and light sources 56 and 57. In the embodiment shown, current interruption means 54 is the operating element of power relay 53.

The control circuit comprises two branches which are connected in parallel across power source 50. The first branch includes door switch means 59, and the coil 62 of relay 60. The second branch comprises line 58, operating element 61 of relay 60, manually operated switch means 63, and coil 55 of power relay 53.

Power relay 53 is a relatively high current capacity relay which is chosen to be able to handle the relatively high light source energizing load current over an extended period of time without becoming defective. Relay 60, on the other hand, is chosen so that its coil, when connected in series with switch means 59, will limit the current flowing through the switch means to a value which is low enough to provide for long and trouble free operation of the switch means. If the coil of relay 60 does not limit the current to a low enough value, then a resistor may be used in series with the switch means.

In the operation of the circuit, when the front landing gear doors open, switch means 59 closes. This establishes current in coil 62 of relay 60 thereby causing the operating element 61 of the relay coil to close. Assuming that manually operated switch means 63 is closed, this in turn completes the circuit comprising operating element 61, switch means 63, and coil 55 of power relay 53. This energizes power relay 53 causing the operating element 54 of the relay to close. This completes the power circuit, and load current is supplied to light sources 56 and 57.

When the landing gear doors close, switch means 59 opens, causing operating element 61 of relay 60 to open, which in turn causes operating element 54 of power relay 53 to open, thereby interrupting the flow of load current to light sources 56 and 57.

Manually operated switch means 63 is located in the cabin of the aircraft and is accessible to the pilot. By opening this switch means, the pilot can turn the lights off at any time, and switch means 63 would ordinarily be left open during daytime operation. Diodes 64 and 65, which are connected across the solenoids, prevent reverse voltages, which may be generated when the solenoids relax, from interferring with the operation of the circuit.

Typical elements for a specific embodiment of the circuit include:

| | |
|---|---|
| Lamps 56 and 57 | General Electric P/N 4596 |
| Circuit Breaker 52 | Potter and Brumfield 507-220-101 |
| Relay 53 | Leach or Cutler Hammer M52416601 |
| Relay 60 | Potter and Brumfield SC110B |
| Switch 63 | Cutler Hammer MS35058-22 |
| Diodes 64 and 65 | IN645 |

While the circuit has been described in conjunction with a switch means 59 which closes when the landing gear doors open, and with solenoids which normally hold their operating members open, it should be appreciated that the circuit can also be effected with a switch means 59 which opens when the landing gear doors open, and with solenoids which hold their operating members normally closed. In this regard, it is intended that the invention encompass such equivalents which are within the scope of the appended claims.

What is claimed is:

1. Aircraft landing, take-off, and taxiing illumination apparatus for use in combination with an aircraft having a fuselage, a retractable front landing gear, on openable and retractable front landing gear door located in a forward bottom portion of the fuselage, and an electric power source, comprising, illumination means including at least one electric light source, mounting means for mounting such illumination means on an interior portion of such landing gear door, and electrical circuit apparatus for automatically controlling delivery of load current from such power source to the illumination means when the landing gear door is in the open position and for interrupting load current in such illumination means when the landing gear door is in the closed position, such circuit apparatus including power circuit means for carrying such load current, a control circuit for carrying a control signal without carrying load current, and switch means for changing state responsive to the opening and retracting of such landing gear door, the power circuit interconnecting the electrical power source and the illumination means and including means for interrupting load current in the power circuit, the control circuit intercoupling the switch means and the power circuit and including control means for controlling the means for interrupting load current in the power circuit responsive to the state of the switch means.

2. The illumination apparatus of claim 1 for use in combination with an aircraft having two front landing gear doors in which each front landing gear door is connected to the fuselage by a hinge means, such illumination means comprises at least two light sources, and such mounting means including a support frame for each such light source, and a flange secured to the support frame, the flange including means adapted for attachment to the landing gear door with the hinge means.

3. The illumination apparatus of claim 1 in which the control circuit includes two circuit branches connected in parallel with the power circuit for connection across the aircraft electrical power source, such circuit branches comprising a first circuit branch in which the switch means is connected in series with an electrically operable actuator means, and a second circuit branch in which current is established by such actuator means for the first circuit branch, such second circuit branch including a load current actuator means for operating the current interruption means in the power circuit.

4. The illumination apparatus of claim 3 in which one of such branches further includes a manually operable switch means for interrupting the load current independently of the state of such automatically responsive switch means.

5. Aircraft lighting circuit apparatus for use in combination with an aircraft having an extensible and retractable mechanism, such lighting circuit apparatus providing increased service life and reliability by controlling load current between an aircraft electrical power source and an aircraft light source with such control of load current being exercised by a control signal of significantly less magnitude than the load current, such light source being movable under control of such aircraft extensible and retractable mechanism between a retracted non-lighted position and an extended lighted position, comprising power circuit means for carrying load current, a control circuit for carrying a control signal, and, switch means for automatically changing state responsive to movement of such movable aircraft mechanism, the power circuit interconnecting the electrical power source and the light source and including means for interrupting load current in the power circuit, the control circuit intercoupling such switch means and the power circuit and including two circuit branches connected in parallel with the power circuit for connection across the aircraft electrical power source, such circuit branches comprising, a first circuit branch in which the switch means is connected in series with electrically operable actuator means, and a second circuit branch in which current is established by electrical operation of the actuator means of the first circuit branch, such second circuit branch including a second electrically operable actuator means for operating the current interruption means in the power circuit.

6. The aircraft lighting circuit apparatus of claim 5 further including a manually operable switch means capable of interrupting load current independently of such automatically responsive switch means, such manually operated switch means being connected in such second circuit branch in series with such load current actuator means.

7. The aircraft lighting circuit apparatus of claim 5 in which the electrically operable actuator means of the first circuit branch comprises a relatively low power switching solenoid means and in which the electrically operable load current actuator means of the second circuit branch comprises a relatively higher power switching solenoid means.

8. The aircraft lighting circuit apparatus of claim 7 including a diode connected across each solenoid of the solenoid means.

* * * * *